3,658,893
PRODUCTION OF o-BENZOYLBENZOIC ACID
Hans Juergen Sturm and Herbert Armbrust, Grunstadt, and Manfred Eisert and Hans-Georg Schecker, Ludwigshafen, Germany, assignors to Badische Anilin- & Soda-Fabrik Aktiengesellschaft, Ludwigshafen (Rhine), Germany
No Drawing. Filed Mar. 23, 1970, Ser. No. 22,034
Claims priority, application Germany, Mar. 26, 1969, P 19 15 385.6; July 4, 1969, P 19 34 086.4
Int. Cl. C07c 65/20
U.S. Cl. 260—517                                11 Claims

ABSTRACT OF THE DISCLOSURE

Production of o-benzoylbenzoic acid by oxidation of an indan with nitric acid and/or a chromium (VI) compound. The product is a valuable starting material for many syntheses, particularly for the production of anthraquinone.

---

The invention relates to a process for the production of o-benzoylbenzoic acid by the oxidation of an indan with nitric acid and/or a chromium (VI) compound.

It is known from Ullmann's Encyklopädie der technischen Chemie, volume 3, page 660, that phthalic acid and benzene can be reacted to form o-benzoylbenzoic acid in a Friedel-Crafts reaction in the presence of aluminum chloride. It is a disadvantage of this method that there is an uneconomically high consumption of catalyst. o-Benzoylbenzoic acid is also formed in the oxidation of 1-methyl-3-phenylindan with chromic acid but only in unsatisfactory yields and mixed with a high proportion of byproducts, for example o-acetylbenzophenone (J. Org. Chem., 19, 17 et seq. (1954); J. Amer. Chem. Soc., 72, 4918 et seq. (1950)). This result is explained at least in part by the influence of the oxidation medium on the o-benzoylbenzoic acid formed. When o-benzoylbenzoic acid is oxidized under the conditions of this method, only 45% of the starting material is obtained unreacted, i.e. the major portion is destroyed by the oxidation medium (J. Amer. Chem. Soc., loc. cit., page 4920). When 1,1,3-trimethyl-3-phenylindan is used as starting material, the oxidation process has to be modified, but the modified process also only gives moderate yields of o-benzoylbenzoic acid and a high proportion of o-acetylbenzophenone (Ber., 90, 1208 et seq. (1957)).

The object of this invention is to provide a new process for the production of o-benzoylbenzoic acid by a simple and economical method in better yields and very high purity.

This and other objects of the invention are achieved and o-benzoylbenzoic acid is obtained advantageously by the oxidation of an indan by oxidizing an indan having the general formula:

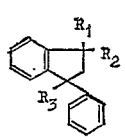

(I)

where $R^1$, $R^2$ and $R^3$ may be identical or different and each denotes an alkyl radical, or $R^1$ and/or $R^3$ may each denote a hydrogen atom, with nitric acid and/or a chromium VI compound.

When 1-methyl-3-phenylindan is used, the reaction may be represented by the following equations:

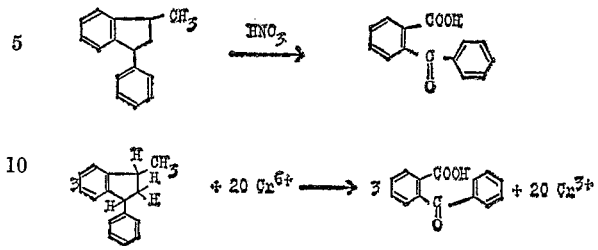

As compared with prior art methods, the process according to the invention gives o-benzoylbenzoic acid in a simple and economical method in better yields and very high purity and without the formation of considerable amounts of o-acetylbenzophenone. These advantageous results are surprising having regard to the state of the prior art. For example, it would have been expected that there would be an additional substantial proportion of nitrated compounds due to the use of nitric acid. When using small amounts of oxidizing agents, the formation of additional substantial proportions of incompletely oxidized byproducts, e.g. o-acetylbenzophenone, would have to be feared.

The indans used as starting material (I) may be prepared by dimerization of unsubstituted or substituted styrenes, for example by the methods described in the said publications or in Rabjohn, Organc Syntheses, Collective Volume IV (John Wiley Inc., New York, 1963), pages 665 et seq. Preferred indans are those in whose formula $R^1$, $R^2$ and $R^3$ may be identical or different and each denotes an alkyl radical having one to eight, particularly one to four, carbon atoms, or $R^1$ and/or $R^3$ may each denote a hydrogen atom. Examples of suitable indans are 1-methyl-3-phenylindan, 1,3-dimethyl-3-phenylindan, 1,1,3-trimethyl-3-phenylindan, 1-propyl-3-phenylindan and 1-isobutyl-3-phenylindan.

The reaction is as a rule carried out at a temperature of from 50° to 250° C., preferably from 110° to 230° C., using nitric acid, or from 90 to 110° C. using a chromium (VI) compound and/or nitric acid at atmospheric or superatmospheric pressure, for example at a pressure of up to 100 atmospheres, generally at the autogenous pressure set up under the reaction conditions. The reaction may be carried out continuously or batchwise.

Starting material (I) is reacted with nitric acid in a stoichiometric amount or in excess, preferably in a molar ratio of 1 mole of starting material (I) to 3 to 30 moles, particularly 3 to 20 moles, of nitric acid. Aqueous nitric acid solutions containing 2 to 50% by weight of nitric acid are generally used for the oxidation, preferably 5 to 40% and partcularly 5 to 30% by weight. The optimum nitric acid concentration and amount of nitric acid for a given temperature may easily be ascertained by a preliminary experiment.

The reaction may be carried out as follows: A mixture of starting material (I) and nitric acid having the concentration specified above is placed in an autoclave and kept at the reaction temperature and the reaction pressure for about fifteen minutes to two hours. The reaction mixture is then cooled and the end product may be isolated therefrom by a conventional method, for example by filtration or decanting, but as a rule the end product may be used immediately without being isolated.

The starting material I is generally reacted with a chromium (VI) compound in less than 1.5, preferably less than 1.15, particularly from 0.1 to 1.1 times the stoichiometric amount based on starting material I. Examples of suitable chromium (VI) compound are monoor polychromic acids such as di-, tri- or tetrachromic acid, and also their anhydrides and salts. Preferred salts are alkali and alkaline earth metal chromates and dichromates, particularly sodium and potassium chromates and dichromates.

When using a chromium (VI) compound as the oxidizing agent the reaction is usually carried out in the presence of a solvent such as an organic or preferably an inorganic acid. It is advantageous to use sulfuric acid, preferably in the form of a 10 to 80% by weight aqueous solution, and/or nitric acid, preferably as a 10 to 65% by weight aqueous solution. When organic acids, e.g. alkane-carboxylic acids such as acetic acid or propionic acid are used, lower yields of end product are obtained. In general, the reaction is carried out using 1.5 to 50 moles of sulfuric acid (calcd 100% per mole of chromium (VI) compound.

In a preferred embodiment of the process, nitric acid is used as the oxidizing agent in combination with a chromium (VI) compound.

Surprisingly, the amount of chromium (VI) compound can be substantially reduced when using the said combination of oxidizing agents, without the yield of end product being impaired. The preferred use of the said combination therefore offers special economic advantages. It is advantageous to use 3 to 50 moles of nitric acid (calcd 100%) per mole of chromium (VI) compound and 0.1 to 1.1, preferably 0.1 to 0.3, times the stoichiometric amount of chromium (VI) compound, based on starting material I.

The reaction may be carried out as follows: A mixture of starting material I, chromium (VI) compound and nitric acid of the said concentration is kept for approximately 2 to 8 hours at the reaction temperature, it being advantageous to place the starting material I and nitric or sulfuric acid in the reactor and add the chromium (VI) compound in the acid used in portions during 0.2 to 4 hours. The reaction mixture is then cooled and the end product isolated in the usual manner, e.g. by filtration or decanting.

The compound which can be prepared by the process according to the invention is a valuable starting material for many syntheses (see for example Ullmann's Encyclopädie der technischen Chemie, volume 3, pages 660 et seq.). It is of particular importance as a starting material for the production of anthraquinone. The process according to the invention opens up a convenient way of preparing anthraquinone, starting from styrene (which is cheap). After nitric acid has been removed, when a chromium (VI) compound is not used, the o-benzoylbenzoic acid is advantageously cyclized in the reaction mixture obtained by the process according to the invention. The yield of o-benzoylbenzoic is therefore derived exactly from the yield of anthraquinone.

A further starting material for dyes, benzanthrone, is obtained by reaction with glycerol under reducing conditions (Annali di Chimica Applicata, 22, 691 et seq. (1932)).

The invention is illustrated by the examples. The parts in the following examples denote parts by weight.

EXAMPLE 1

6 parts of 1-methyl-3-phenylindan (94%) is oxidized with 47 parts of 30% nitric acid for one hour in an autoclave at 220° C. After cooling, the autoclave is released from pressure and the aqueous phase is separated by decantation. The organic phase remaining in the autoclave is dissolved in dilute caustic soda solution and o-benzoylbenzoic acid is precipitated by careful acidification while cooling.

Yield: 3 parts=48.8% of the theory.

The melting point is 125° to 126° C. after the product has been recrystallized from a mixture of benzene and cyclohexane.

EXAMPLE 2

Reaction is carried out analogously to Example 1 with 70.5 parts of 20% nitric acid.

Yield: 3.2 parts=52% of the theory.

EXAMPLE 3

Reaction is carried out analogously to Example 1 at a temperature of 200° C. The o-benzoylbenzoic acid obtained is cyclized in 40 parts of 100% sulfuric acid during one hour at 150° C. to form anthraquinone. The anthraquinone is precipitated by pouring into a mixture of ice and water, suction filtered, heated in hot dilute caustic soda solution, suction filtered and washed with water until neutral.

Yield: 3.5 parts of arthraquinone (62% of the theory).

EXAMPLE 4

Reaction is carried out analogously to Example 1 at 160° C.

Yield: 4.8 parts of o-benzoylbenzoic acid (78.2% of the theory).

EXAMPLE 5

Reaction is carried out analogously to Example 1 at 170° C.

Yield: 4.9 parts of o-benzoylbenzoic acid (79.8% of the theory).

EXAMPLE 6

2.7 parts of 1-methyl-3-phenylindan (99%) is oxidized at 220° C. with 120 parts of 5% nitric acid for one hour at 220° C. The product is worked up analogously to Example 1.

Yield: 1.8 parts of o-benzoylbenzoic acid (61.2% of the theory).

EXAMPLE 7

6 parts of 1,1,3-trimethyl-1-phenylindan is oxidized with 80 parts of 30% nitric acid analogously to Example 1.

Yield: 4.1 parts of o-benzoylbenzoic acid (71.2% of the theory).

EXAMPLE 8

6 parts of 1-methyl-3-phenylindane (94%) is oxidized with 56.5 parts of nitric acid (25%) for one hour at 170° C. in an autoclave. Working up is carried out analogously to Example 1.

Yield: 4.8 parts of o-benzoylbenzoic acid (78.2% of the theory).

EXAMPLE 9

6 parts of 1-methyl-3-phenylindan(94%) and 94 parts of nitric acid (40%) are stirred in a vessel for four hours under reflux. After cooling, the aqueous phase is decanted off and the mixture is kept with 40 parts of sulfuric acid (100%) for one hour at 150° C. After working up analogously to Example 2, 3.8 parts of anthraquinone (66% of the theory) is obtained.

EXAMPLE 10

A mixture of 70 parts of chromium (VI) oxide and 380 parts of sulfuric acid (40% w./w.) is added to a mixture of 20 parts of 1-methyl-3-phenylindan and 60 parts of sulfuric acid (40% w./w) during 4 hours at 100 to 105° C. The mixture is kept for 4 hours at 100 to 105° C. with efficient agitation, cooled, diluted with 400 parts of water and filtered. The filtrate is poured in 1,000 parts of 1 N caustic soda solution and the mixture heated to 100° C. and filtered. The filtrate is acidified to precipitate the end product. 20 parts (92% of the theory) of o-benzoylbenzoic acid is obtained. M.P. 120° (from benzene/cyclohexane).

EXAMPLE 11

A mixture of 20 parts of sodium dichromate and 350 parts of nitric acid (40% w./w.) is added to a mixture of 20 parts of 1-methyl-3-phenylindan and 100 parts of nitric acid (40% w./w.) during 5 hours at 100 to 105° C. The mixture is kept for 4 hours at 100 to 105° C. with efficient agitation, cooled, diluted with 400 parts of water and filtered. The filtrate is poured in 1,000 parts of 1 N caustic soda solution and the mixture heated to 100° C. and filtered. The filtrate is acidified to precipitate the end product. 20.8 parts (95% of the theory) of o-benzoylbenzoic acid is obtained.

EXAMPLE 12

Reaction is carried out analogously to Example 11 but using 20% by weight nitric acid. 16.4 parts (75% of the theory) of o-benzoylbenzoic acid is obtained.

EXAMPLE 13

Reaction is carried out analogously to Example 11 but using 10 parts of sodium dichromate.

Yield: 16.1 parts of o-benzoylbenzoic acid (74% of the theory).

We claim:
1. A process for the production of o-benzoylbenzoic acid which comprises oxidizing an indan having the formula:

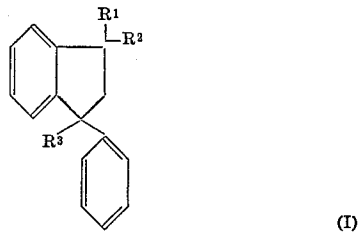

(I)

where $R^1$ and $R^3$ each denotes hydrogen or alkyl and $R^2$ denotes alkyl at a temperature of from 50 to 250° C. with at least one oxidizing agent selected from the class consisting of nitric acid and a chromium (VI) compound, said oxidizing agent being present with at least a stoichiometric amount of oxygen in acid form for completion of said oxidation.

2. A process as claimed in claim 1 wherein a chromium (VI) compound is used in less than 1.5 times the stoichiometric amount, based on indan.

3. A process as claimed in claim 1 carried out at a temperature of from 110° to 230° C. using nitric acid.

4. A process as claimed in claim 1 carried out with a chromium (VI) compound in combination with nitric acid.

5. A process as claimed in claim 1 carried out in a molar ratio of 1 mole of starting material (I) to 3 to 30 moles of nitric acid.

6. A process as claimed in claim 1 carried out in a molar ratio of 1 mole of starting material I to 3 to 20 moles of nitric acid.

7. A process as claimed in claim 1 carried out with aqueous nitric acid solutions containing 2 to 50% by weight of nitric acid.

8. A process as claimed in claim 1 carried out with aqueous nitric acid solutions containing 5 to 40% of nitric acid.

9. A process as claimed in claim 1 carried out with aqueous nitric acid solutions containing 5 to 30% by weight of nitric acid.

10. A process as claimed in claim 1 carried out with 0.1 to 1.1 times the stoichiometric amount of a chromium (VI) compound, based on starting material I.

11. A process as claimed in claim 1 wherein 3 to 50 moles of nitric acid, calculated 100%, is used per mole of chromium (VI) compound, and 0.1 to 0.3 times the amount of chromium (VI) compound, based on starting material I.

References Cited

Spoerri et al.: Jour. Amer. Chem. Soc., vol. 72, pp. 4918–20 (1950).

Dierichs et al.: Ber., vol. 90, pp. 1208–14 (1957).

JAMES A. PATTEN, Primary Examiner

U.S. Cl. X.R.

260—352, 369